United States Patent
Hsu et al.

(10) Patent No.: US 8,599,773 B2
(45) Date of Patent: Dec. 3, 2013

(54) METHOD AND SYSTEM FOR SELECTIVE SCALABLE CHANNEL-BASED STATION ENABLEMENT AND DE-ENABLEMENT IN TELEVISION BAND WHITE SPACES

(75) Inventors: Ju-Lan Hsu, Saratoga, CA (US); Harkirat Singh, Santa Clara, CA (US); Su Khiong Yong, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 368 days.

(21) Appl. No.: 12/821,062

(22) Filed: Jun. 22, 2010

(65) Prior Publication Data

US 2011/0116458 A1 May 19, 2011

Related U.S. Application Data

(60) Provisional application No. 61/262,035, filed on Nov. 17, 2009.

(51) Int. Cl.
*H04W 4/00* (2009.01)

(52) U.S. Cl.
USPC ......................................................... 370/329

(58) Field of Classification Search
USPC ......................................................... 370/329
See application file for complete search history.

(56) References Cited

U.S. PATENT DOCUMENTS

| 7,876,786 | B2 | 1/2011 | Bahl et al. | |
|---|---|---|---|---|
| 7,995,526 | B2 | 8/2011 | Liu et al. | |
| 2003/0231621 | A1* | 12/2003 | Gubbi et al. | 370/352 |
| 2003/0231650 | A1* | 12/2003 | Shoemake et al. | 370/464 |
| 2009/0143019 | A1 | 6/2009 | Shellhammer | |
| 2009/0268674 | A1 | 10/2009 | Liu et al. | |
| 2010/0041401 | A1* | 2/2010 | Moore | 455/434 |
| 2010/0195667 | A1* | 8/2010 | Wang et al. | 370/466 |
| 2010/0271948 | A1* | 10/2010 | Challapali et al. | 370/235 |
| 2010/0330919 | A1* | 12/2010 | Gurney et al. | 455/67.11 |
| 2011/0080882 | A1* | 4/2011 | Shu et al. | 370/329 |
| 2011/0085538 | A1* | 4/2011 | Feinberg | 370/343 |
| 2011/0087639 | A1* | 4/2011 | Gurney | 707/690 |
| 2011/0299509 | A1* | 12/2011 | Wang et al. | 370/336 |

FOREIGN PATENT DOCUMENTS

WO 2010114640 A1 10/2010

OTHER PUBLICATIONS

Smith, Steve; Essentials of an 802.11y network; Jan. 1, 2009; Cabling Installation and Maintenance; 17; 1-4.*
International Search Report and Written Opinion dated Aug. 2, 2011 for International Application No. PCT/KR2010/007931, pp. 1-9, Korean Intellectual Property Office, Seo-gu, Daejeon, Republic of Korea.

(Continued)

*Primary Examiner* — Mark Rinehart
*Assistant Examiner* — Christopher R Crompton
(74) *Attorney, Agent, or Firm* — Kenneth L. Sherman, Esq.; Michael Zarrabian, Esq.; Sherman & Zarrabian LLP

(57) ABSTRACT

A method and system for wireless communication in a TV band white space spectrum is provided. A wireless master device keeps track of available wireless communication channels in a white space spectrum. The master device performs an enablement process for enabling a corresponding client device to transmit on a wireless channel. During the enablement process, the master device allows the client device to select a wireless channel for communication from among: a specific operating wireless channel, a subset of the available wireless channels, and all available wireless channels.

43 Claims, 8 Drawing Sheets

(56) References Cited

OTHER PUBLICATIONS

IEEE Computer Society, "IEEE Std 802.11y™-2008, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 3: 3650-3700 MHz Operation in USA", IEEE, Nov. 6, 2008, pp. i-74, New York, United States.

Perahia, E. et al., "IEEE P802.11 Wireless LANs TGad Functional Requirements (IEEE 802.11-09/0228r2)", IEEE, Mar. 12, 2009, pp. 1-3, United States, https://mentor.ieee.org/802.11/file/Public/09/Nov. 9, 0228-02-00ad-functional-requirements.doc.

Wi-Fi Alliance, "A New Regulatory and Technical Environment for Wireless Broadband: A Primer on the IEEE 802.11y Amendment", Wi-Fi Alliance, 2008, pp. 1-7, United States, http://www.wi-fi.org/files/kc/WFA_11y_Primer_final.pdf.

Federal Communications Commission (FCC), "FCC 08-260 Second Report and Order", FCC, Nov. 14, 2008, pp. 1-130, United States, http://hraunfoss.fcc.gov/edocs_public/attachmatch/FCC-08-260A1.pdf.

IEEE Computer Society, "IEEE Std 802.11™-2007 (Revision of IEEE Std 802.11-1999 ), IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE, Jun. 12, 2007, pp. i-1184, New York, United States.

Mexican Office Action mailed May 24, 2013 for Mexican Application No. MX/a/2012/004964 from Instituo Mexicano de la Propiedad Industrial, pp. 1- 3, Mexico (English-language translation pg. 1).

Australian Patent Examination Report No. 1 mailed Jul. 24, 2013 for Australian Application No. 2010322652 from Australian Government, IP Australia, pp. 1-3, Australia.

\* cited by examiner

| Category | Action value | Requester STA Add | Responder STA Add | Reason Code | Enablement ID | Available Channel List IE |
|---|---|---|---|---|---|---|

| Category | Action value | Requester STA Add | Responder STA Add | Reason Code | Enablement ID | Available Channel List IE | Active Channel List IE |
|---|---|---|---|---|---|---|---|
| | | | | | | 31 | 41 |

METHOD AND SYSTEM FOR SELECTIVE SCALABLE CHANNEL-BASED STATION ENABLEMENT AND DE-ENABLEMENT IN TELEVISION BAND WHITE SPACES

RELATED APPLICATION

This application claims priority from U.S. Provisional Patent Application Ser. No. 61/262,035 filed on Nov. 17, 2009, incorporated herein by reference.

FIELD OF THE INVENTION

The present invention relates in general to wireless communication, and in particular, to wireless communication in television band white spaces.

BACKGROUND OF THE INVENTION

There are currently major trends in releasing unused television (TV) bands and enabling unlicensed cognitive operations in the TV white space (TVWS) band. IEEE 802.11 specifies a wireless local area network (WLAN) standard providing specifications for a physical (PHY) layer and a Media Access Control (MAC) layer for interoperable WLAN radio network devices for non-TVWS bands.

BRIEF SUMMARY OF THE INVENTION

Embodiments of the invention provide a method and system for wireless communication in a white space spectrum. A wireless master device keeps track of available wireless communication channels in a white space spectrum. The master device performs an enablement process for enabling a corresponding client device to transmit on a wireless channel. During the enablement process, the master device allows the client device to select a wireless channel for communication from among: a specific operating wireless channel, a subset of the available wireless channels, and all available wireless channels.

These and other features, aspects and advantages of the present invention will become understood with reference to the following description, appended claims and accompanying figures.

BRIEF DESCRIPTION OF THE DRAWINGS

FIG. 3 shows an example Dynamic Station Enablement (DSE) frame format including an available channel list information element (IE) for selective scalable channel-based station enablement and de-enablement, according to an embodiment of the invention.

FIG. 4 shows an example DSE frame format including an available channel list IE and an active channel list IE for selective scalable channel-based station enablement and de-enablement, according to an embodiment of the invention.

DESCRIPTION OF THE INVENTION

Embodiments of the invention provide a method and system for selective and dynamic scalable channel-based station enablement and de-enablement in television band white spaces (TVWS). According to embodiments of the invention, a station comprises a wireless white space device. In one example, a white space device is a certified wireless device that may operate without an exclusive broadcast license in the RF spectrum below a certain frequency (e.g., 700 MHz). White space devices can access the Internet at wireless broadband speeds using underutilized portions of the radio frequency spectrum known as white space.

One embodiment of the invention provides dynamic channel-based selective and scalable enablement/de-enablement of wireless TVWS client devices (client stations) utilized by wireless TVWS master devices (master stations) for operations in the TVWS. A master device is configured to manage enablement and de-enablement of client devices residing in multiple unique configurations of operating channels (i.e., wireless channels), suitable for multiple TV channels in the TVWS.

According to an embodiment of the invention, a wireless communication master device keeps track of a list of available channels indicated by a TVWS geolocation database and/or by sensing. During an enablement process the master device allows a corresponding client device to use: (1) a specific operating channel, (2) a subset of the available channels, or (3) all available channels. An initial enablement of the client device is temporary and contingent on the client device reporting a selected channel configuration to the master device by a prescribed deadline. Once the initial enablement is complete, periodic renewal of enablement (along with channel status updates) takes place between the master and client devices. The master device de-enables or announces channel switch to any subsets of the client devices when channel availability/condition changes.

In the IEEE 802.11y standard, Dynamic Station Enablement (DSE) allows high powered Wi-Fi devices to operate on a co-primary basis in the 3650 to 3700 MHz band. An Enabling wireless station STA (i.e., Enabling STA or master device) may enable/de-enable its Dependent wireless station STAs (i.e., Dependent STAs or client devices).

Figure 1:
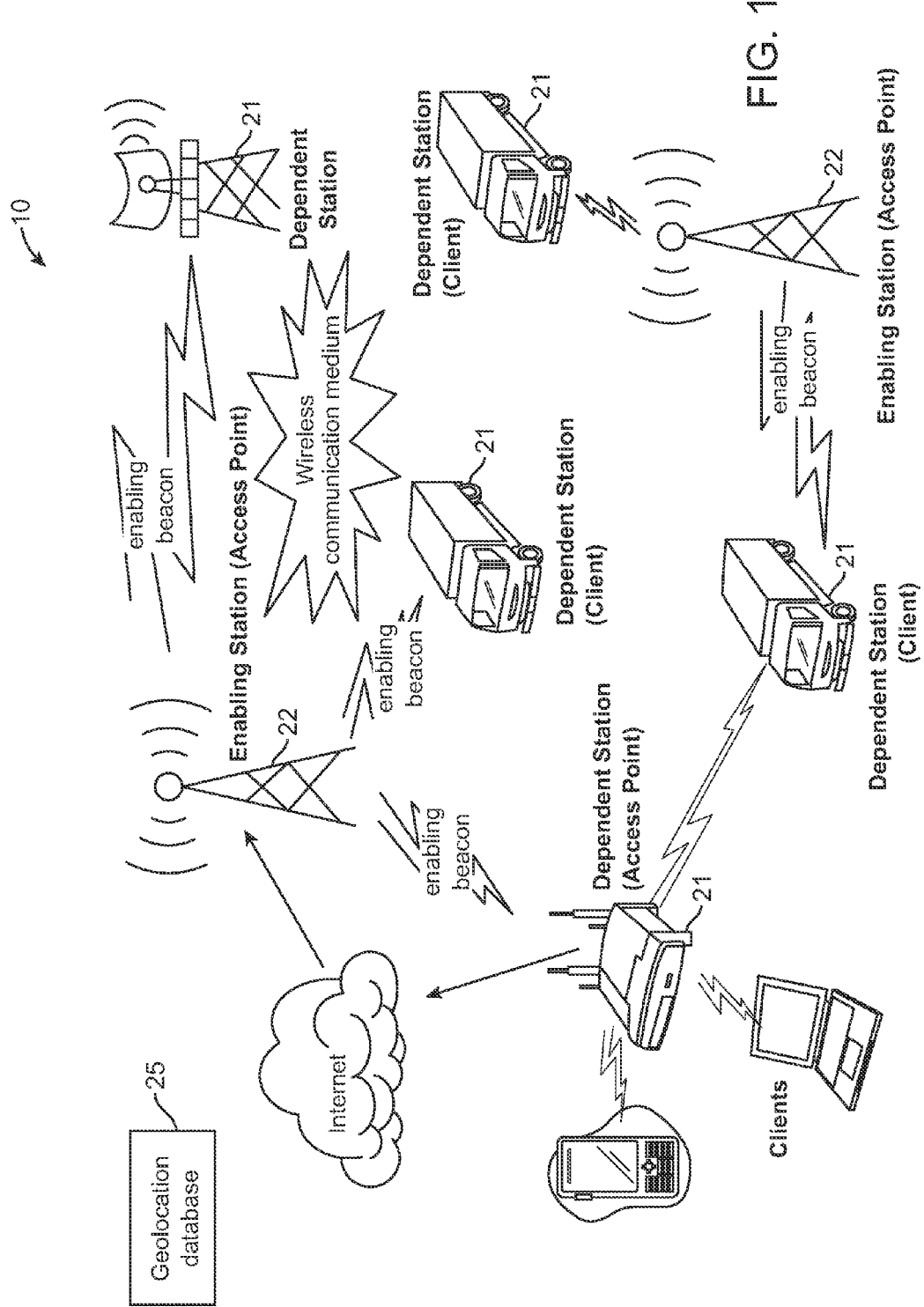
FIG. 1 shows a network of wireless TV white space electronic devices (stations), implementing selective scalable channel-based station enablement and de-enablement, according to an embodiment of the invention.

FIG. 1 shows an example wireless network 10, according to an embodiment of the invention, including Enabling STAs 22 wherein an Enabling STA 22 selects a specific TV channel (center frequency and bandwidth), wherein Dependent STAs 21 need not use the same TV channel configuration as the Enabling STA. For example, there are multiple TV channels available across 500 MHz 700 MHz band, and as such Dependent STAs 21 are not required to use the same channel as their Enabling STAs.

Embodiments of the present invention provide a channel-based scalable enablement/de-enablement process. Embodiments of the invention further provide dynamic control of enablement/de-enablement on a scalable channel basis. In the TVWS, a Dependent STA must be enabled by an Enabling STA in order to be able to transmit. The Dependent STA is a client device comprising a Mode-I portable/personal device. The Enabling STA is a master device comprising a Mode-II or a fixed device.

A personal/portable white space device is either in Mode-I, under the control of a fixed device or a personal/portable device that employs geolocation database access and spectrum sensing, or in Mode-II wherein the personal/portable device is a master device that employs geolocation database access and spectrum sensing itself. Personal/portable white space devices operating in either mode sense signals such as TV signals, wireless microphone signals, and signals of other services that operate in the TV bands, including those that operate on an intermittent basis, at levels as low as −114 dBm. Personal/portable devices are not required to register with a geolocation database system.

To operate in the TVWS without violating regulations, a client device is enabled and under control of a master device, wherein the master device may be a Mode-II portable/personal device or a fixed device. Embodiments of the present invention provide selective scalable channel-based dynamic station enablement/de-enablement, wherein an enablement and maintenance procedure guides the client device to configure its channelization in a dynamic and scalable fashion. Further, an enablement-driven channel switch with dynamic channel configuration updates between client and master devices.

Figure 2:
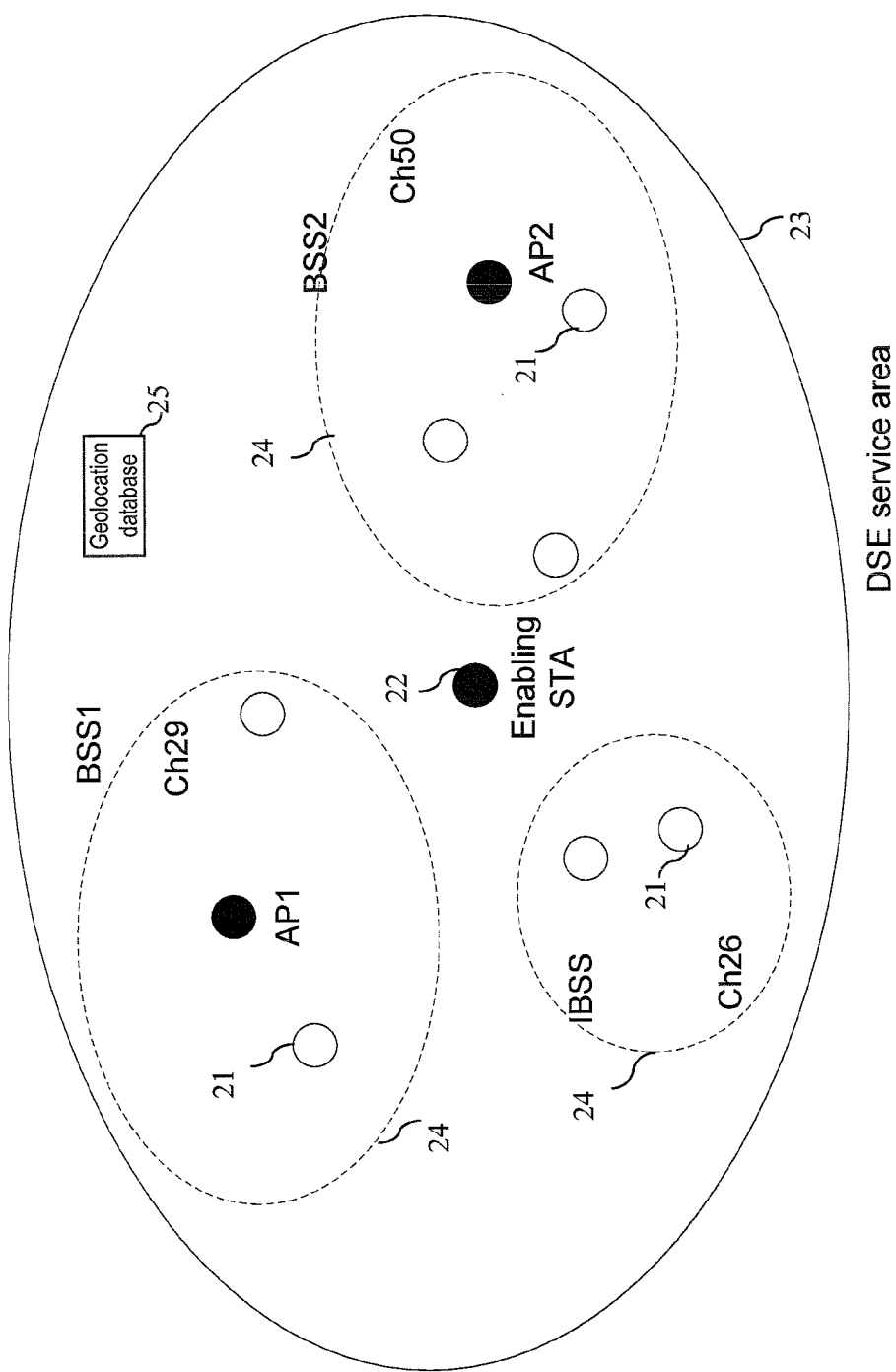
FIG. 2 shows another view of a wireless network based on the network of FIG. 1, implementing selective scalable channel-based station enablement and de-enablement, according to an embodiment of the invention.

Referring to FIG. 2, an example wireless network 20 according to an embodiment of the invention includes Dependent STAs 21 comprising client devices, and an enabling STA 22 comprising a master device. The network 20 implements a scalable channel-based Dynamic Station Enablement (DSE) service area 23 managed by the Enabling STA 22 in TVWS. In the IEEE 802.11y standard, DSE allows high powered Wi-Fi devices to operate on a co-primary basis in the 3650 to 3700 MHz band.

According to an embodiment of the invention, the Enabling STA 22 powers up and creates a DSE service area by selecting a pilot channel to wirelessly transmit enabling beacons. When a Dependent STA 21 that needs enablement powers up, it performs passive scanning for the Enabling STA 22. Once a Dependent STA 21 receives enabling beacons from the Enabling STA 22, the Dependent STA 21 as a DSE requester STA may send a DSE request frame to the Enabling STA 22.

In TVWS, the enablement and management procedure needs to support multiple TVWS channels with multiple unique center frequencies and scalable channel width configurations.

According to an embodiment of the invention, the network 10 is a TVWS network of wireless device STAs 21 and 22, wherein an Enabling STA 22 enables all other STAs 21 which are Dependent STAs of the Enabling STA 22. The areas 24 illustrate the Basic Service Sets (BSSs) of non-overlapped (or overlapped) channels created by the Dependent STAs 21, including a BSS created by access point AP1, one BSS created by access point AP2 and one Independent Basic Service Set (IBSS). The Enabling STA 22 maintains the channel configuration information of all enabled Dependent STAs that it manages, and optionally the services provided in those channels. Fixed devices and Mode-II portable/personal devices are capable of being enabling STAs, but do not necessarily do so. A personal/portable device may operate in Mode-II (as a master device) by employing geolocation database access and spectrum sensing itself.

If the Enabling STA 22 accepts a DSE request, the Enabling STA sends a response frame to a Dependent STA with a Reason Code set to Success, the DSE requester STA (the Dependent STA) is enabled and becomes a Dependent STA of the Enabling STA. The DSE requester STA, now the Dependent STA, will follow identical channel configuration as the Enabling STA. Once enabled, the Dependent STA is required to engage in periodic renewal of enablement with the Enabling STA. The Enabling STA may de-enable the Dependent STA and may send channel switch announcement to mandate channel switch when appropriate.

Once the Enabling STA 22 accepts a DSE request in responding to a requester STA 21, the Enabling STA 22 sends along a list of channels which the Enabling STA 22 allows the requester STA 21 to operate at. For different requester STAs 21, the list of channels can be the same or partially overlapped or non-overlapped.

In one example according to the invention, the list of channels contains all available channels in this geographical area indicated by a wireless TVWS geolocation database device 25 (FIGS. 1-2) and the requester STA 21 may select a subset of the list of channels at which it will operate.

In another example, the list of channels contains a partial, single, bonded, aggregated channel at which the Enabling STA 22 assigns the requester STA 21 to operate. In yet another example, the list of channels contain a subset of channels indicated available by the TVWS geolocation database wherein the requester STA 21 may select among the subset assigned by the Enabling STA 21.

In addition to the allowed channel list provided by the Enabling STA 22 in said DSE response frame, according to an embodiment of the invention, the Enabling STA 22 may assist the requester STA 21 in more quickly discovering available services and activities. In one example, the Enabling STA 22 provides such assistance by sending a requester STA 21 a form of mapping between available services and channel numbers, along with the allowed channel list. The Enabling STA 22 may list the channels that are currently active. The Enabling STA 22 may also list services that are available for each channel.

At the time when the requester STA 21 receives the DSE response frame with a Reason Code set to success from the Enabling STA 22, the requester STA 21 is not yet fully enabled. According to an embodiment of the invention, in this stage, the requester STA 21 scans the allowed channel list, but is not yet enabled with full capability to transmit actual data frames. To be fully enabled, the requester STA 21 is required to notify/confirm with the Enabling STA 22 within a prescribed deadline its selected operating channel configuration or whether the requester STA 21 accepts the channel assignment from the Enabling STA 22. Otherwise, the requester STA 21 is de-enabled and must restart the process. In one example, the requester STA 21 may negotiate with the Enabling STA 22 for desirable allowed channels.

Once fully enabled, the requester STA 21 becomes a Dependent STA 21 and periodic renewal of enablement takes place between the Enabling STA 22 and the Dependent STA 21. Updates of the allowed channel list and activity/service information are communicated through a periodic enablement renewal process by the Enabling STA 22. The Enabling STA 22 may send channel-based de-enablement frames to de-enable subsets of its Dependent STAs 21 when a channel becomes no longer available. The Enabling STA 22 may send channel-based Channel Switch Announcement (CSA) to mandate subsets of its Dependent STAs 21 to perform channel switch when appropriate.

Further according to an embodiment of the invention, the Enabling STA 22 keeps track of the channel selection of all its Dependent STAs 21 at all times. Dependent STAs 21 keep track of a pilot channel (i.e., the operating channel of the Enabling STA 22) at all times. When a station in network 10, either the Enabling STA 22 or a Dependent STA 21 intends to perform a channel switch, the station notifies its counterpart station before doing so (unless regulatory requirements disallow the notification). The Dependent STA may perform Dynamic Frequency Selection (DFS) among the channels indicated in the allowed channel list by the Enabling STA 22. When the Dependent STA 21 notifies the Enabling STA 22 of its intention to perform DFS, the Enabling STA 22 may acknowledge or reject with Reason Code and/or an updated allowed list.

In the context of IEEE 802.11 wireless local area networks (WLANs), according to an embodiment of the invention to enable selective scalable channel-based enablement in TVWS, the Enabling STA 22 may append additional information to the DSE response frame sent to the requester STA 21 (when the Enabling STA grants the request). Said additional information comprises the allowed channel list or available channel list as a new Information Element (IE). FIG. 3 shows an example DSE Enablement frame format 30 including an available channel list IE 31, according to an embodiment of the invention.

In addition to the allowed channel list provided by the Enabling STA 22 in said DSE response frame, as noted according to an embodiment of the invention, the Enabling STA 22 may assist the requester STA 21 in more quickly discovering available services and activities. The Enabling STA 22 may send the requester STA 21 a form of mapping between available services and channel numbers, along with the allowed channel list.

In one implementation, to assist a temporarily enabled requester STA 21 in conducting expedited service discovery/scanning, the Enabling STA 22 provides service channel mapping information to the requester STA 21. FIG. 4 shows an example DSE Enablement frame format 40 including a service channel mapping information as the Active Channel List IE 41, and the Available Channel List IE 31, according to an embodiment of the invention. In one implementation, the available channel list IE includes a white space map, where each bit in the map corresponds to a specific channel and indicates the channel availability by setting its value to 0 or 1. In another implementation, the available list IE enumerates the available channels. Similar mapping schemes may be applied to the active channel list IE.

When periodic renewal of enablement takes place, the Enabling STA 22 also includes updated Available Channel List IE 31 and Active Channel List IE 41 when such information has changed since the last renewal. According to another embodiment of the invention, the Enabling STA 22 may send updates of the IEs 31, 41 once such information has changed without waiting till the next renewal.

Figure 5:
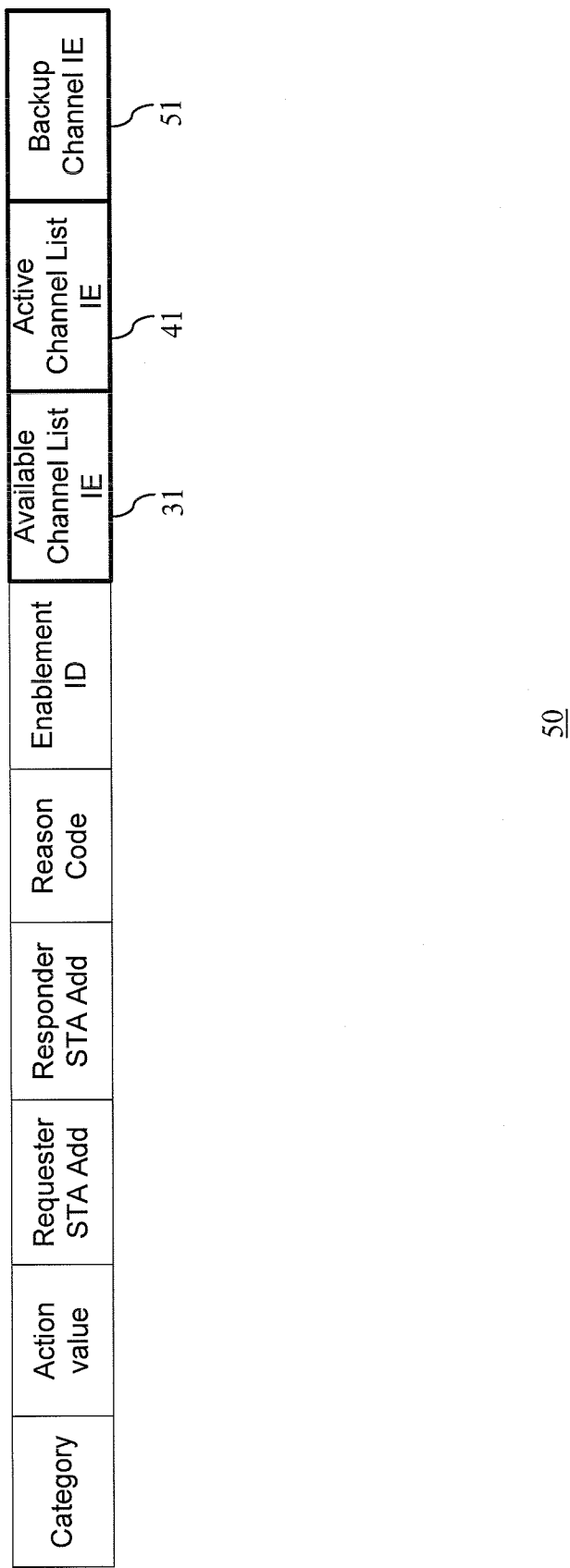
FIG. 5 shows an example DSE frame format further including a Backup Channel IE for selective scalable channel-based station enablement and de-enablement, according to an embodiment of the invention.

When the operating channel (i.e., pilot channel) of the Enabling STA 22 becomes unavailable, the Enabling STA 22 may need to cease transmission/switch channel before an opportunity to notify its Dependent STAs. A situation where the Dependent STAs lose connection with the Enabling STA all at once is undesirable. According to an embodiment of the invention, the enabling STA 22 may use a Backup Channel IE to dictate a meeting channel in case of connection loss. The Backup Channel IE may include a single or multiple backup channels where the sequence of the channels dictates certain priority/order of the backup meeting channels. FIG. 5 shows an example DSE Enablement frame format 50 further including a Backup Channel IE 51, according to the invention.

Figure 6:
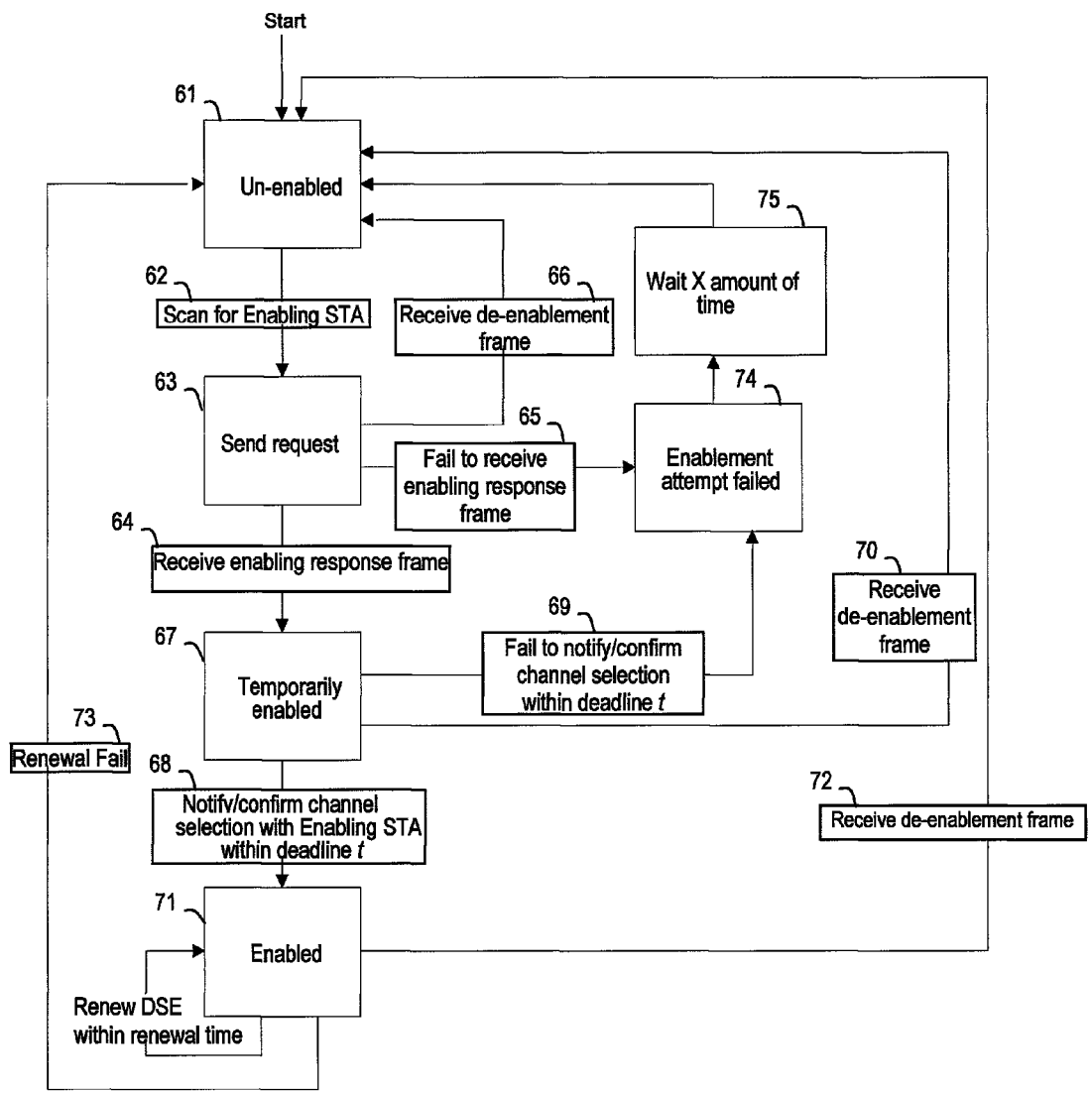
FIG. 6 shows a flowchart of a process implemented by a wireless dependent (client) white space device in a network of wireless TV white space electronic devices, according to an embodiment of the invention.

FIG. 6 shows a flowchart of a process 60 for a Dependent STA 21, according to an embodiment of the invention. The process 60 includes the following process blocks:

Block 61: Un-enabled.
Block 62: Scan for Enabling STA.
Block 63: Send request.
Block 64: Upon receiving enabling response frame, proceed to block 67.
Block 65: Upon failure to receive enabling response frame, proceed to block 74.
Block 66: Upon receiving de-enablement frame, proceed to block 61.
Block 67: Temporarily enabled.
Block 68: Upon notification/confirmation of channel selection with Enabling STA within deadline t, proceed to block 71.
Block 69: Upon failure to notify/confirm channel selection within deadline t, proceed to block 74.
Block 70: Upon receiving de-enablement frame, proceed to block 61.
Block 71: Enabled. Upon renewing DSE within renewal time, repeat block 71.
Block 72: Upon receiving de-enablement frame, proceed to block 61.
Block 73: Upon renewal failure, proceed to block 61.
Block 74: Enablement attempt failed.
Block 75: Wait X amount of time. Proceed to block 61.

Figure 7:
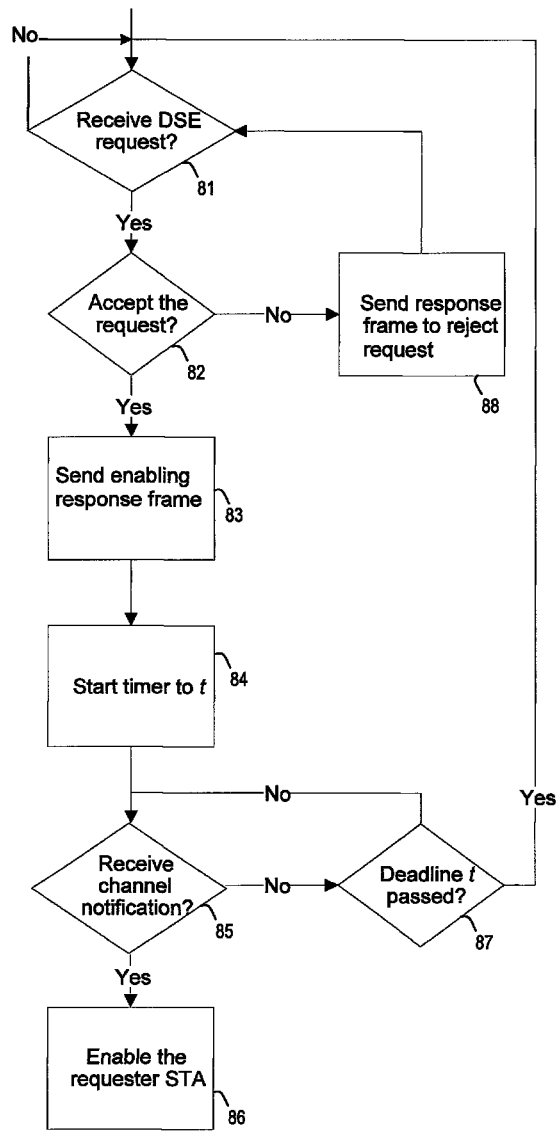
FIG. 7 shows a flowchart of an enablement process implemented by a wireless enabling (master) white space device in a network of wireless TV white space electronic devices, according to an embodiment of the invention.

FIG. 7 shows a flowchart of an example enablement process 80 for an Enabling STA 22, according to an embodiment of the invention. The process 80 includes the following process blocks:

Block 81: Determine if a new DSE request is received from a requester STA. If yes, proceed to block 82, else remain in block 81 to check.
Block 82: If the DSE request is accepted, proceed to block 83, else proceed to block 88.
Block 83: Send enabling response frame to the requester STA.
Block 84: Set a timer to a deadline time t.
Block 85: Determine if channel notification is received? If yes, proceed to block 86, else proceed to block 87.
Block 86: Enable requester STA. End.
Block 87: Determine if deadline time t has passed? If yes, proceed to block 81, else proceed to block 85.
Block 88: Send response frame to requester STA to reject DSE request. Proceed to block 81.

Figure 8:
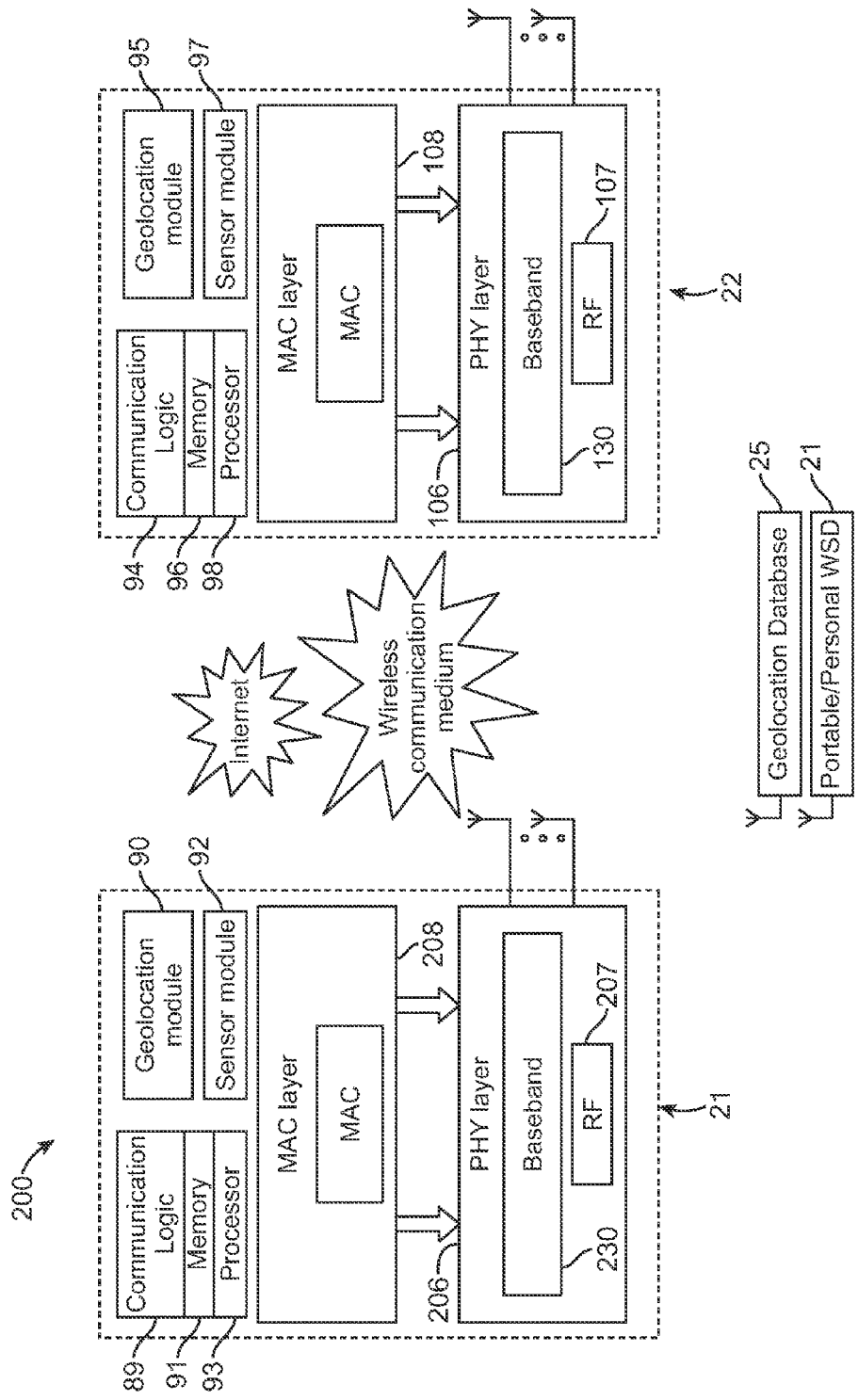
FIG. 8 shows example device architecture in a network of wireless TV white space electronic devices, implementing selective scalable channel-based station enablement and de-enablement, according to an embodiment of the invention.

FIG. 8 shows a block diagram of a wireless communication system 200 as an example implementation of aspects of the network 23 in FIG. 2, according to an embodiment of the invention. The system 100 includes wireless white space devices (WSD) such as client devices 21, wireless master devices 22 and a geolocation database 25. The device 21 may further comprise a geolocation module 90 for communicating with the geolocation database 25.

Each client (dependent) device 21 includes a physical (PHY) layer 206, a Media Access Control (MAC) layer 208, communication logic 89 implementing functions such as process 60 in FIG. 6, according to embodiments of the invention. The client device 21 further comprises a memory 91, a processor 93 and a sensor module 92 for spectrum sensing as needed. In another embodiment, the communication logic 89 may also be a component of the MAC layer 208.

The PHY layer 206 includes a radio frequency (RF) communication module 207 which wirelessly transmits/receives signals under control of a baseband process module 230. The baseband module 230 allows communicating control information and data. The MAC layer may further include an application layer for packetizing data, wherein data packets are then converted to MAC packets.

According to an embodiment of the invention, a master (enabling) device 22 configured to manage enablement and de-enablement of wireless communication client devices 21, comprises hardware similar to that of the client devices 21. In one embodiment, a master device has geolocation capability while a client device does not.

Each master device 22 includes a PHY layer 106, a MAC layer 108, communication logic 94 implementing functions such as process 80 in FIG. 7, according to embodiments of the invention. The master device 22 may further comprise a geolocation module 95 for communicating with the geolocation database 25 as needed, a memory 96, a processor 98 and a sensor module 97 for spectrum sensing as needed. In another embodiment, the communication logic 94 may also be a component of the MAC layer 108.

The PHY layer 106 includes a radio frequency (RF) communication module 107 which wirelessly transmits/receives signals under control of a baseband process module 130. The baseband module 130 allows communicating control information and data. The MAC layer may further include an application layer for packetizing data, wherein data packets are then converted to MAC packets.

According to embodiments of the invention, master/client devices herein refer to TVWS enabling/dependent devices (not to be confused with IEEE 802.11 master/client devices).

According to embodiments of the invention a master (enabling) device may utilize a wireless or wireline link for communication with the geolocation database. Similarly, a Mode-II client device may utilize a wireless and/or wireline link for communication with the geolocation database. The geolocation database comprises a device (such as a computer system maintaining geolocation data) that utilizes a wireless and/or wireline link for communication. In general, a geolocation database provides identification of real-world geographic location of an object, such as a wireless station/device or an Internet-connected station/device.

The Federal Communications Commission (FCC) for the United States provides regulations with specific definitions for devices qualifying as master devices, wherein non-qualifying devices may function as client devices that need to be enabled/managed by a master device. As such, in one example, a master device and a client device may have hardware configurations as defined by the FCC (e.g., FCC document is FCC-08-260, and ruling in Appendix B, http://hraunfoss.fcc.gov/edocs public/attachmatch/FCC-08-260A1.pdf, released Nov. 14, 2008). The present invention provides novel configurations and enhancements to such master and client devices for functionality according to the embodiments of the invention described herein. The regulations are subject to change by the FCC. The present invention is further useful with other regulations for TVWS or similar bands, and/or regulations by other countries or entities corresponding to those by the FCC.

The invention provides a process that is essentially compliant with FCC requirements that client devices are under the control of master devices. A flexible master device implementation is provided, wherein spectrum management may be either distributed or centralized. The invention further provides efficient utilization of the TVWS band spectrum without installing multiple master devices in a single geographical area. Scalable channel based management allows simple configurations of channel bonding/aggregation/fragmentation.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:
1. A method for wireless communication in a white space spectrum, comprising:
   a master device keeping track of available wireless communication channels in a white space spectrum;
   the master device performing an enablement process for enabling a corresponding client device to transmit on a wireless channel; and
   during the enablement process, the master device providing service channel mapping to the corresponding client device, and allowing the client device to select a wireless channel for communication from among: a specific operating wireless channel, a subset of the available wireless channels, and all available wireless channels, wherein said service channel mapping comprises an active channel list and an available channel list.

2. The method of claim 1, wherein:
an initial enablement of the client device to transmit is contingent on the client device reporting a selected channel configuration to the master device by a prescribed deadline.

3. The method of claim 2, further comprising:
the client device selecting a channel from those allowed by the master device, and reporting a selected channel configuration to the master device by a prescribed deadline.

4. The method of claim 3, further comprising:
upon completion of the enablement process, performing periodic renewal of enablement, along with channel status updates, between the master device and the client device.

5. The method of claim 4, further comprising:
the master device de-enabling the client device when availability and/or condition of a selected channel changes.

6. The method of claim 5, further comprising:
the master device announcing channel switch to the client device when channel availability and/or condition of a selected channel changes.

7. The method of claim 6, wherein:
the white space spectrum comprises television band white space (TVWS) wireless spectrum;
the master device comprises a TVWS wireless device capable of self-enablement;
each client device comprises a TVWS wireless device incapable of self-enablement; and
the master device keeps track of available wireless channels by sensing the spectrum, and/or as indicated by a TVWS geolocation database.

8. The method of claim 7, further comprising:
the master device managing enablement and de-enablement of multiple client devices residing in multiple unique configurations of wireless channels, suitable for multiple TV channels in the TVWS wireless spectrum.

9. The method of claim 8, further comprising:
the master device enabling multiple client devices requesting enablement;
the master device maintaining the selected channel configuration information of all enabled client devices managed by the master device, and the services provided in the selected channels; and
for different client devices, the allowed channels can be the same or partially overlapped or non-overlapped.

10. The method of claim 9, further comprising:
the master device performing enablement of a client device using scalable channel-based Dynamic Station Enablement (DSE); and
the client device performing channel selection among the allowed channels and notifying the master device.

11. The method of claim 10, further comprising:
the master device providing a client device DSE enablement frame including one or more of: an information element indicating available channels, an information element indicating active channels and an information element indicating a backup channel.

12. The method of claim 1, wherein providing service channel mapping comprises sending a mapping between available services and channels to the corresponding client device.

13. The method of claim 1, wherein the master device creates a dynamic station enablement (DSE) service area by selecting a pilot channel to transmit enabling beacons upon power up.

14. The method of claim 1, wherein upon the corresponding device being enabled, the corresponding client device becomes a dependent station and periodic renewal of enablement takes place between the master device and the corresponding client device.

15. The method of claim 10, wherein the client device receives a DSE frame.

16. The method of claim 15, wherein the DSE frame comprises an active channel list information element (IE) portion and an available channel list IE portion.

17. The method of claim 16, wherein the available channel list IE comprises a white space map.

18. A wireless communication system for wireless communication in a white space spectrum, comprising:
a white space master device;
a wireless white space client device;
the master device comprising a communication module configured for keeping track of available wireless communication channels in a white space spectrum and performing an enablement process for enabling the client device to transmit on a wireless channel, wherein during the enablement process, the master device providing service channel mapping to the client device, and allows the client device to select a wireless channel for communication from among: a specific operating wireless channel, a subset of the available wireless channels, and all available wireless channels, wherein said service channel mapping comprises an active channel list and an available channel list.

19. The system of claim 18, wherein:
an initial enablement of the client device to transmit is contingent on the client device reporting a selected channel configuration to the master device by a prescribed deadline.

20. The system of claim 19, wherein:
the client device is configured for selecting a channel from those allowed by the master device, and reporting a selected channel configuration to the master device by a prescribed deadline.

21. The system of claim 20, wherein:
the master device and the client device are configured for, upon completion of the enablement process, performing periodic renewal of enablement, along with channel status updates, between the master device and the client device.

22. The system of claim 21, wherein:
the communication module of the master device is configured for de-enabling the client device when availability and/or condition of a selected channel changes.

23. The system of claim 22, wherein:
the communication module of the master device is further configured for announcing channel switch to the client device when channel availability and/or condition of a selected channel changes.

24. The system of claim 23, wherein:
the white space spectrum comprises television band white space (TVWS) wireless spectrum;
the master device comprises a TVWS wireless device capable of self-enablement;
each client device comprises a TVWS wireless device incapable of self-enablement; and
the communication module of the master device is further configured for keeping track of available wireless channels by sensing the spectrum, and/or as indicated by a TVWS geolocation database.

25. The system of claim 24, wherein:
the communication module of the master device is configured for managing enablement and de-enablement of multiple client devices residing in multiple unique configurations of wireless channels, suitable for multiple TV channels in the TVWS wireless spectrum.

26. The system of claim 25, wherein:
the communication module of the master device is configured for enabling multiple client devices requesting enablement;
the communication module of the master device is configured for maintaining the selected channel configuration information of all enabled client devices managed by the master device, and the services provided in the selected channels; and
for different client devices, the allowed channels can be the same or partially overlapped or non-overlapped.

27. The system of claim 26, wherein:
the communication module of the master device is configured for performing enablement of a client device using scalable channel-based Dynamic Station Enablement (DSE); and
the client device is configured for performing channel selection among the allowed channels and notifying the master device.

28. The system of claim 27, wherein:
the communication module of the master device is configured for providing a client device DSE enablement frame including one or more of: an information element indicating available channels, an information element indicating active channels and an information element indicating a backup channel.

29. A wireless master device for wireless communication in a white space spectrum, comprising:
a communication module configured for keeping track of available wireless communication channels in a white space spectrum and performing an enablement process for enabling a client device to transmit on a wireless channel, wherein during the enablement process, the master device providing service channel mapping to the client device, and allows the client device to select a wireless channel for communication from among: a specific operating wireless channel, a subset of the available wireless channels, and all available wireless channels, wherein said service channel mapping comprises an active channel list and an available channel list.

30. The wireless master device of claim 29, wherein:
an initial enablement of the client device to transmit is contingent on the client device reporting a selected channel configuration to the master device by a prescribed deadline.

31. The wireless master device of claim 30, wherein:
the communication module is configured for, upon completion of the enablement process, performing periodic renewal of enablement, along with channel status updates, between the master device and the client device.

32. The wireless master device of claim 31, wherein:
the communication module is configured for de-enabling the client device when availability and/or condition of a selected channel changes.

33. The wireless master device of claim 32, wherein:
the communication module is further configured for announcing channel switch to the client device when channel availability and/or condition of a selected channel changes.

34. The wireless master device of claim 33, wherein:
the white space spectrum comprises television band white space (TVWS) wireless spectrum;
the master device comprises a TVWS wireless device capable of self-enablement;
each client device comprises a TVWS wireless device incapable of self-enablement; and
the communication module of the master device is further configured for keeping track of available wireless channels by sensing the spectrum, and/or as indicated by a TVWS geolocation database.

35. The wireless master device of claim 34, wherein:
the communication module of the master device is configured for managing enablement and de-enablement of multiple client devices residing in multiple unique configurations of wireless channels, suitable for multiple TV channels in the TVWS wireless spectrum.

36. The wireless master device of claim 35, wherein:
the communication module is configured for enabling multiple client devices requesting enablement, and maintaining the selected channel configuration information of all enabled client devices managed by the master device, and the services provided in the selected channels; and
for different client devices, the allowed channels can be the same or partially overlapped or non-overlapped.

37. The wireless master device of claim 36, wherein:
the communication module is configured for performing enablement of a client device using scalable channel-based Dynamic Station Enablement (DSE).

38. The wireless master device of claim 37, wherein:
the communication module is configured for providing a client device DSE enablement frame including one or more of: an information element indicating available channels, an information element indicating active channels and an information element indicating a backup channel.

39. A wireless client device for wireless communication in a white space spectrum, comprising:
a communication module configured for selecting a wireless communication channel in a white space spectrum from those allowed by a master device, and reporting a selected channel configuration to the master device by a prescribed deadline;
wherein the master device is configured for keeping track of available wireless communication channels in the white space spectrum and performing an enablement process for enabling the client device to transmit on a wireless channel, wherein during the enablement process, the master device providing service channel mapping to the corresponding client device, and allows the client device to select a wireless channel for communication from among: a specific operating wireless channel, a subset of the available wireless channels, and all available wireless channels, wherein said service channel mapping comprises an active channel list and an available channel list.

40. The wireless client device of claim 39, wherein:
an initial enablement of the client device to transmit is contingent on the client device reporting a selected channel configuration to the master device by a prescribed deadline.

41. The wireless client device of claim 40, wherein:
the master device is configured for performing enablement of a client device using scalable channel-based Dynamic Station Enablement (DSE); and
the client device is further configured for performing channel selection among the allowed channels and notifying the master device.

42. The wireless client device of claim 41, wherein:
the communication module is configured for, upon completion of the enablement process, performing periodic renewal of enablement, along with channel status updates, between the master device and the client device.

43. The wireless client device of claim 42, wherein:
the white space spectrum comprises television band white space (TVWS) wireless spectrum;
the master device comprises a TVWS wireless device capable of self-enablement;
the client device comprises a TVWS wireless device incapable of self-enablement; and
the master device is further configured for keeping track of available wireless channels by sensing the spectrum, and/or as indicated by a TVWS geolocation database.

* * * * *